United States Patent
Judd

[15] 3,688,186
[45] Aug. 29, 1972

[54] METHOD AND APPARATUS FOR EDDY CURRENT FLAW DETECTION UTILIZING A DETECTOR WITH A POSITIVE AND TWO NEGATIVE FEEDBACK LOOPS

[72] Inventor: Tyler W. Judd, Chardon, Ohio

[73] Assignee: Republic Steel Corporation, Cleveland, Ohio

[22] Filed: Nov. 18, 1970

[21] Appl. No.: 90,571

[52] U.S. Cl..................................................324/37
[51] Int. Cl...............................................Golr 33/12
[58] Field of Search ..............324/37, 40, 41; 331/65

[56] References Cited

UNITED STATES PATENTS

| | | | |
|---|---|---|---|
| 3,469,204 | 9/1969 | Magyar et al. | 331/65 |
| 2,832,040 | 4/1958 | Harmon | 324/34 |
| 2,267,884 | 12/1941 | Zuschlag | 324/40 |
| 3,344,668 | 10/1967 | Schuck | 73/304 C |

Primary Examiner—Robert J. Corcoran
Attorney—Robert P. Wright and Joseph W. Malleck

[57] ABSTRACT

An eddy current flaw detector, and method of operation thereof, for detecting defects in metallic workpieces. The flaw detector includes an oscillator circuit having an operational amplifier, a negative feedback circuit coupled between the output terminal and an inverting input terminal of the amplifier, and a positive feedback circuit coupled between the output terminal and a non-inverting input terminal of the amplifier. Also, a search probe is electrically coupled to the non-inverting input terminal of the operational amplifier to form a portion of the positive feedback circuit thereby providing a flaw detector with improved operational stability.

13 Claims, 2 Drawing Figures

INVENTOR.
TYLER W. JUDD

METHOD AND APPARATUS FOR EDDY CURRENT FLAW DETECTION UTILIZING A DETECTOR WITH A POSITIVE AND TWO NEGATIVE FEEDBACK LOOPS

CROSS REFERENCES TO RELATED PATENT APPLICATIONS AND PATENTS

U.S. Pat. No. Re 26,286, to W. C. Harmon entitled, "Method and Apparatus for Inspecting Workpieces Which are Relatively Independent of Probe Motion," issued on Oct. 17, 1967, and assigned to the same assignee as the present invention.

U.S. Pat. No. 2,832,040 to W. C. Harmon entitled, "Direct Reading Seam Depth Indicator," issued on Apr. 22, 1958, and assigned to the same assignee as the present invention.

U.S. Pat. No. 3,180,230 to the same inventor as the present invention, entitled, "Defect Marking Apparatus", issued on Apr. 27, 1965 and assigned to the same assignee as the present invention.

U.S. Pat. No. 3,263,809 to J. M. Mandula et. al. entitled, "Apparatus for Defect Analysis and Classification of Workpieces," issued on Aug. 2, 1966 and assigned to the same assignee as the present invention.

U.S. Pat. No. 3,394,302 to the same inventor as the present invention, entitled, "Delay Circuitry for Automatic Bar Classifier," issued on July 23, 1968 and assigned to the same assignee as the present invention.

BACKGROUND OF THE INVENTION

This invention pertains to the art of flaw detectors for inspecting metallic workpieces, and more particularly, to a flaw detecting system utilizing novel inspection and oscillator circuits.

In the above-referenced U.S. Pat. No. 2,832,040, there is described a flaw detector for inspecting metallic workpieces in order to locate flaws, such as cracks, by applying a high frequency oscillating signal to a search coil which is placed in proximity to the surface of a workpiece to be inspected. A varying electromagnetic field is established by the coil, which in turn induces eddy currents into the workpiece. A defect in the workpiece has the effect of varying the value of the induced eddy currents, and a variation in the value of the eddy currents causes a variation in the amplitude of the oscillating signal. The amplitude of the oscillating signal is monitored to provide an indication of variations in the amplitude of this signal to thereby detect the presence of the flaw.

One problem that has long existed with flaw detectors is that with variations in the characteristics of circuit components employed in the high-frequency oscillator circuits of these detectors, such as vacuum tubes and transistors, etc., there is a corresponding increase or decrease in the frequency and amplitude of oscillation. With the numerous circuit components utilized in the amplifying portions of the oscillator circuits, and the probability of these components changing in value due to variations in the ambient temperature, it is necessary that the flaw detectors be calibrated at periodic intervals to insure that the oscillator is operating at the desired amplitude. This problem of variations in the amplitude of oscillation of the oscillator circuit in flaw detectors is compounded by the fact that these instruments are operated in an environment in which the temperature may vary over a wide range of temperatures during the interval of a single day.

Various attempts have been made in the past to stabilize the oscillator circuits in flaw detectors. For example, feedback stages, such as an automatic gain control circuit, have been included in the oscillator circuits of flaw detectors in order to maintain the amplitude level of the oscillations at a substantially constant level, except for changes produced when a defect is detected by the flaw detector. One such example of an oscillator circuit having an automatic gain control circuit in the flaw detector circuit is disclosed in the above-referenced U.S. Pat. No. 2,832,040. Even with an oscillator circuit having an automatic gain control circuit for stabilizing the operation, the problem of variations in the amplitude of oscillation still exists. Another example of the use of a single feedback stage to stabilize the operation of an oscillator circuit is disclosed in the above-mentioned U.S. Pat. No. RE 26,286 to W. C. Harmon. The problem of operating stability is not, however, completely overcome by these circuit arrangements.

It is therefore an object of the present invention to provide a flaw detector having an oscillator circuit which is extremely stable and in which the amplitude of oscillation is substantially independent of a majority of the circuit components employed in the oscillator circuit.

Another object of the present invention is to provide a flaw detector having an oscillator circuit which includes a pair of feedback stages for stabilizing the operation of the oscillator.

Another object of the present invention is to provide a flaw detector having a pair of feedback stages which take the form of a negative feedback loop and a positive feedback loop.

Another object of the present invention is to provide a flaw detector having a positive and a negative feedback loop, as well as an automatic gain control stage.

Another object of the present invention is to provide a flaw detector with improved stability and accuracy of measurement, thereby substantially eliminating the periodic calibration tests which must be conducted with conventional detectors.

A further object of the present invention is to provide a flaw detector for detecting defects in metallic workpieces which maintains an original calibration over extended intervals of time.

A still further object of the present invention is to provide a flaw detector which includes an oscillator circuit having a pair of feedback loops and in which the detector search probe forms a portion of one of the feedback loops.

SUMMARY OF THE INVENTION

The present invention is directed toward a flaw detecting device for detecting defects in metallic workpieces, thereby overcoming the noted disadvantages, and others, of such previously known systems.

In accordance with one aspect of the present invention there is provided a flaw detector having a variable impedance inspection probe, an oscillator circuit coupled to the search probe, a rectifier circuit coupled to the oscillator circuit, and an indicator device, such as an indicator lamp, coupled to the rectifier circuit for providing an output indication upon the detection of a defect. The improvement in the present invention comprises an operational amplifier having an inverting input terminal, a non-inverting input terminal, and an output terminal which is coupled to the rectifier circuit. A pair of feedback circuits, and in particular, a positive feedback circuit and a negative feedback circuit are coupled between the output terminal and the inverting and non-inverting input terminals, respectively, of the amplifier. Also, the non-inverting input terminal of the amplifier is coupled to the variable impedance inspection probe. Thus, upon detection of a defect by the search probe, the amplitude of oscillation of the oscillator circuit is varied to thereby provide an indication of the detection of the flaw.

In accordance with another aspect of the present invention, an automatic gain control circuit is coupled between the output of the rectifier circuit and the inverting input terminal of the operational amplifier to maintain the negative feedback signal at a level necessary to sustain oscillation at the desired amplitude.

In accordance with still another aspect of the present invention, the automatic gain control circuit comprises an integrator circuit which is coupled through a field-effect transistor circuit to the inverting input terminal of the operational amplifier to prevent signals applied to the automatic gain control circuit from varying instantaneously and thereby nullifying the amplitude variations developed upon the detection of a flaw.

In accordance with another aspect of the present invention, there is provided a method of detecting the presence of defects with a flaw detector having an oscillator circuit with a positive and negative feedback loop.

DESCRIPTION OF A PREFERRED EMBODIMENT

Figure 1:
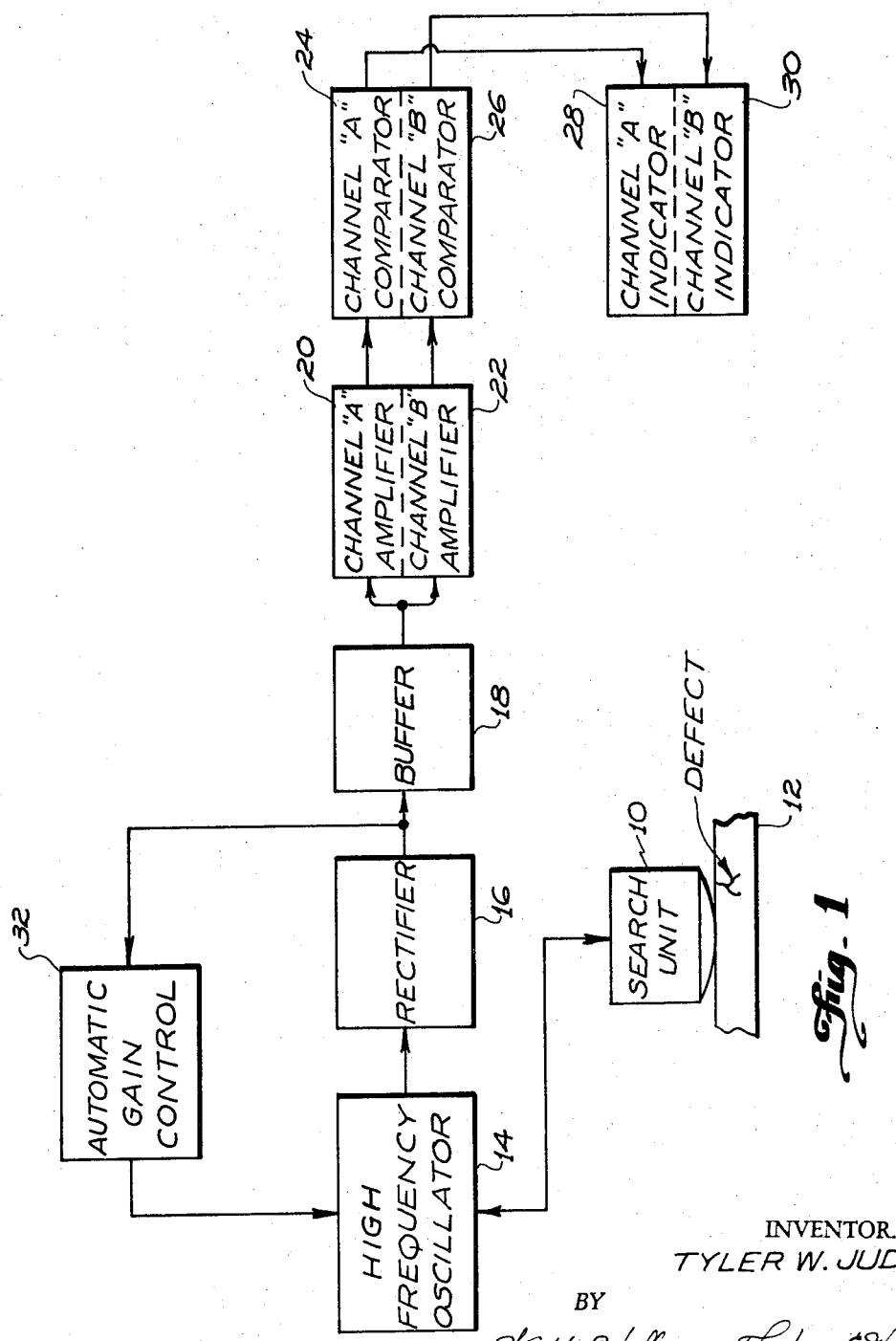
FIG. 1 is an electrical block diagram illustrating in basic form the eddy current flaw detector of the present invention; and, FIG. 2 is an electrical, schematic diagram illustrating in more detail the circuitry of the flaw detector as shown in FIG. 1.

FIG. 1 illustrates in block diagram form an eddy current flaw detector comprised of a search unit 10 adapted to be passed along the surface of a workpiece 12, such as a billet or pipe, to be examined. The search unit 10 is electrically coupled to and energized by a high-frequency oscillator circuit 14. An output terminal of the high-frequency oscillator circuit 14 is coupled through a rectifier circuit 16 and a buffer circuit 18, to the input terminals of a channel "A" amplifier circuit 20 and a channel "B" amplifier circuit 22. The output terminal of the channel "A" amplifier circuit 20 is connected to the input terminal of a channel "A" comparator circuit 24, and the output terminal of the channel "B" amplifier circuit 22 is connected to the input terminal of a channel "B" comparator circuit 26. Also, the output terminal of the channel "A" comparator circuit 24 is connected directly to a channel "A" indicator circuit 28 and the output terminal of the channel "B" comparator circuit is connected directly to the input terminal of a channel "B" indicator circuit 30.

The oscillator 14 develops a high-frequency signal which is rectified by the rectifier 16. A portion of this rectified signal is fed back through an automatic gain control circuit 32 to the oscillator circuit 14. This feedback path, including the automatic gain control 32, when utilized in conjunction with a positive and a negative feedback loop, to be discussed subsequently, provide a flaw detector which is extremely stable in operation. The stability in operation, to a large extent, eliminates the periodic calibration normally required with eddy current flaw detectors.

Figure 2:
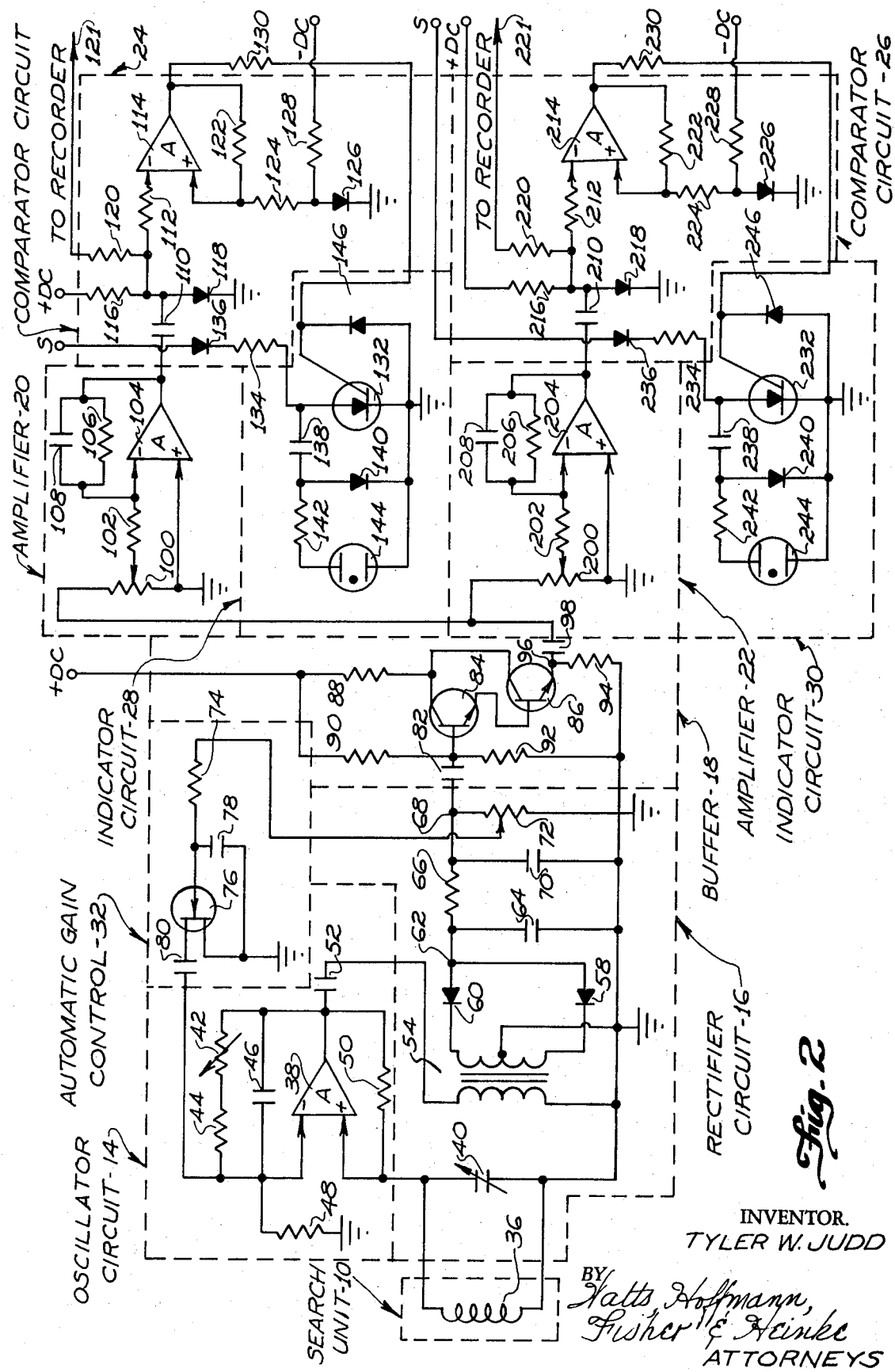

Referring now to FIG. 2, the search unit 10 includes a search coil 36. The search unit 10 is adapted to be moved along the surface of the workpiece 12 to thereby place the coil 36 in proximity with the workpiece. One terminal of the search coil 36 is connected directly to the non-inverting input terminal of an operational amplifier 38 and the other terminal of coil 36 is connected directly to ground.

Connected across the terminals of the search coil 36 is a variable capacitor 40 which serves as a tuning capacitor for the coil 36. The output terminal of operational amplifier 38 is connected through a series-connected potentiometer 42 and resistor 44 to the inverting input terminal of the amplifier, thereby applying a negative feedback signal to this input terminal of the amplifier. A capacitor 46 is shunted across the series-connected potentiometer 42 and resistor 44, and the inverting input terminal of amplifier 38 is connected through a resistor 48 to ground.

Also, the output terminal of amplifier 38 is connected through a resistor 50 to the non-inverting input terminal of this amplifier thereby providing a positive feedback signal to the amplifier. With this circuit arrangement, the oscillator circuit 14, which is generally comprised of the search coil 36, the amplifier 38, the negative feedback loop including potentiometer 42 and resistor 44, and the positive feedback loop including resistor 50, will oscillate at a frequency established by the search coil 36 and the tuning capacitor 40. The amplitude of oscillation is maintained so long as the signal developed by the positive feedback loop is equal to or exceeds the signal developed by the negative feedback loop.

The output terminal of operational amplifier 38 is coupled through a blocking capacitor 52 to one of the input terminals of an audio transformer 54. The other input terminal of transformer 54 is connected directly to ground. The secondary winding of transformer 54 is center tapped, with the center-tapped terminal connected directly to ground. Connected to one terminal of the secondary winding of the transformer 54 is the cathode of a diode 58 having its anode connected directly to the anode of another diode 60. The cathode of the diode 60 is connected to the other terminal of the secondary winding of transformer 54.

The commonly-connected anodes of diodes 58, 60 form a junction point 62, which is coupled directly to a filter network. This network is comprised of a capacitor 64 connected between junction point 62 and ground, a resistor 66 connected between junction point 62 and a junction point 68, and a capacitor 70 connected between junction point 68 and ground.

Connected to junction point 68 is one of the stationary terminals of a potentiometer 72. The other stationary terminal of potentiometer 72 is connected directly to ground, and the movable contact of this potentiometer is connected to one of the terminals of a resistor 74 in the automatic gain control circuit 32. The other terminal of resistor 74 is connected to the gate terminal of a Nmchannel field-effect transistor 76. The gate terminal is also connected through a capacitor 78 to ground. The source terminal of field-effect transistor 76 is connected directly to ground. Finally the drain terminal of field-effect transistor 76 is coupled through a capacitor 80 to the inverting input terminal of the operational amplifier 38.

The junction point 68 in the rectifier circuit 16 is also coupled through a capacitor 82 to the base of an NPN transistor 84 having its emitter connected directly to the base of another NPN transistor 86. The collectors of transistors 84, 86 are coupled in common through a resistor 88 to the positive terminal of a direct-current, voltage supply source. The base terminal of transistor 84 is also connected through a resistor 90 to the positive terminal of the direct-current, voltage supply source and through a resistor 92 to ground. In addition, the emitter of transistor 86 is connected through a resistor 94 to ground. Also, this emitter is connected to a junction point 96.

The junction point 96 is connected to the left terminal, as viewed in FIG. 2, of a capacitor 98, and the right terminal of this capacitor is connected to one of the stationary contacts of a potentiometer 100 in the channel"A" amplifier 20. The other stationary contact of the potentiometer 100 is connected directly to ground, and the movable contact of this potentiometer is connected through a resistor 102 to the inverting input terminal of an operational amplifier 104. The non-inverting input terminal of amplifier 104 is connected directly to ground. A resistor 106 is connected in parallel with a capacitor 108, and this combination of elements is coupled between the output terminal of amplifier 104 and the inverting terminal of the amplifier.

The output terminal of amplifier 104 is connected through a series-connected capacitor 110 and resistor 112 to the inverting input terminal of another operational amplifier 114. A junction point between capacitor 110 and resistor 112 is connected through a resistor 116 to the positive terminal of the direct-current voltage supply source. This junction point is also connected to the anode of a diode 118 having its cathode connected directly to ground. In addition, the junction point between capacitor 110 and resistor 112 is connected through a resistor 120 to an output terminal 121 which may be coupled to a recorder for providing recorded information representative of detected defects in the workpiece 12.

Connected between the output terminal of operational amplifier 114 and the non-inverting input terminal of this amplifier is a resistor 122. In addition, the non-inverting input terminal of this amplifier is connected through a resistor 124 to the anode of a Zener diode 126. The anode of diode 126 is connected through a resistor 128 to the negative terminal of the direct current voltage supply source, and the cathode of diode 126 is connected directly to ground.

The output terminal of amplifier 114 is also connected through a resistor 130 to the channel "A" indicator circuit 28. More particularly, resistor 130 is connected to the gate terminal of a silicon controlled rectifier 132 having its cathode coupled directly to ground. The anode of controlled rectifier 132 is connected through a resistor 134 and a diode 136, polarized as shown in FIG. 2, to a rectified, but unfiltered, voltage supply source S. Also connected to the anode of silicon controlled rectifier 132 is one terminal of a capacitor 138 having its other terminal connected through a diode 140, poled as shown in FIG. 2, to ground. A series-connected resistor 142 and neon indicator lamp 144 are coupled across the diode 140. Finally, a diode 146, polarized as shown in FIG. 2, is connected between the gate terminal of silicon controlled rectifier 132 and ground.

The right terminal of capacitor 98, as viewed in FIG. 2, is also connected to one of the stationary terminals of a potentiometer 200. The other stationary terminal of potentiometer 200 is connected directly to ground and the movable contact of this potentiometer is connected through a resistor 202 to the inverting input terminal of an operational amplifier 204. The non-inverting input terminal of amplifier 204 is connected directly to ground. A resistor 206 is connected in parallel with a capacitor 208 and this combination of elements is coupled between the output terminal of amplifier 204 and the inverting terminal of this amplifier.

The output terminal of amplifier 204 is connected through a series-connected capacitor 210 and resistor 212 to the inverting input terminal of an operational amplifier 214. The junction point between capacitor 210 and resistor 212 is connected through a resistor 216 to the positive terminal of the direct current supply source, and to the anode of a diode 218. The cathode of diode 218 is connected directly to ground. Also, the junction between capacitor 210 and resistor 212 is connected through a resistor 220 to an output terminal 221 which may be coupled to a recorder for providing recorded information representative of detected defects in the workpiece 12.

Connected between the output terminal of operational amplifier 214 and the non-inverting input terminal of this amplifier is a resistor 222. In addition, the non-inverting input terminal of this amplifier is also connected through a resistor 224 to the anode of a Zener diode 226. The anode of diode 226 is connected through a resistor 228 to the negative terminal of the direct current voltage supply source, and the cathode of diode 226 is connected directly to ground.

The output terminal of amplifier 214 is also connected through a resistor 230 to the channel "B" indicator circuit 30. More particularly, resistor 230 is connected to the gate terminal of a silicon controlled rectifier 232 having its cathode connected directly to ground. The anode of silicon controlled rectifier 232 is connected through a resistor 234 and a diode 236, polarized as shown in FIG. 2, to a rectified, but unfiltered voltage supply source S. Also connected to the anode of silicon controlled rectifier 232 is one terminal of a capacitor 238 having its other terminal connected through a diode 240, polarized as shown in FIG. 2, to ground. A series-connected resistor 242 and neon indicator lamp 244 are coupled across the diode 240. Finally, a diode 246, polarized as shown in FIG. 2, is connected between the gate terminal of silicon controlled rectifier 232 and ground. Thus, in the operation of the eddy current flaw detector, a negative feedback signal is applied through the potentiometer 42 and resistor 44 to the inverting input terminal of amplifier 38.

A positive feedback signal is applied through the resistor 50 to the non-inverting input terminal of amplifier 38. With this feedback arrangement, the oscillator circuit 14 will oscillate at a frequency established by the search coil 36 and its tuning capacitor 40. Accordingly, with a change in impedance of the search coil 36, i.e., the presence of a defect in proximity to the search unit 10, the amplitude of oscillation of the oscillator circuit 14 increases.

The output signal of the oscillator circuit 14 is applied through the audio transformer 54 and the full-wave rectifier and filter circuit comprised of diodes 58, 60, capacitors 64, 70, and resistor 66, to provide a direct-current signal having an amplitude which is proportional to the amplitude of the high-frequency oscillating signal. A portion of the direct-current signal developed at the output terminal of the full-wave rectifying circuit is applied through the automatic gain control circuit 32 to the inverting input terminal of amplifier 38.

More particularly, the signal developed at junction point 68 is applied through the potentiometer 72 to the gate terminal of the field-effect transistor 76. Since the drain and source terminals of transistor 76 are coupled between the inverting input terminal of amplifier 38 and ground, the signal developed at junction point 68 has the effect of controlling the negative feedback signal applied to the inverting input terminal of amplifier 38. Thus, the negative feedback signal can be maintained at a value substantially equal to the value of the positive feedback signal thereby causing the operational amplifier 38 to operate in a generally linear region.

A time-delay feature is incorporated in the automatic gain control circuit 32 by the inclusion of an integrating circuit including the resistor 74 and the capacitor 78. Thus, the signal applied to the gate terminal of field-effect transistor 76 does not change instantaneously with variations in the signal applied to junction point 68, but is in fact momentarily delayed. Thus, momentary shifts in the oscillator amplitude are applied to the buffer circuit 18; however, these momentary variations have substantially no effect on the automatic gain control circuit.

The signal developed at junction point 68 is also applied through a buffer circuit 18. The buffer circuit 18 substantially isolates the amplifier circuits 20, 22 from the output of the rectifier circuit 16. The signals applied to amplifiers 20, 22 are amplified and applied to the comparator circuits 24, 26. The comparator circuits 24, 26, being set at different levels, are responsive to defects of different magnitudes in order to develop output signals representative of the defects of different magnitudes. These output signals are then applied to the corresponding indicator circuits 28, 30.

Accordingly, with the setting of the reference level of comparator circuit 24 at a first level, and the setting of the level of comparator circuit 26 at a second level, it is possible to develop indications of defects having two levels of severity, or magnitude.

In accordance with a preferred embodiment of the invention, the values and types of various components illustrated in FIG. 2 are found in Table I:

TABLE I

| Component | Value or Designation |
|---|---|
| Amplifiers 38, 104, 114, 204, 214 | ZEL-1 |
| Transistors 84, 86 | 2N 5308 |
| Transistor 76 | 2N4220 |
| Silicon Controlled Rectifiers 132, 232 | TIC-47 |
| Zener diodes 126, 226 | 1N746 |
| Diodes 58, 60, 118, 146, 218, 246 | 1N485 |
| Diodes 140, 240, 136, 236 | 1N2071 |
| Neon lamps 144, 244 | NE-2H |
| Capacitor 52 | .05 μ farad |
| Capacitor 82 | .033 μ farad |
| Capacitor 98 | 4.7 microfarad |
| Capacitors 64, 70 | .1 μ farad |
| Capacitor 80 | .002 μ farad |
| Capacitor 78 | .22 μ farad |
| Capacitors 46, 108, 208 | 47 picofarad |
| Capacitor 40 | .002 μ farad |
| Capacitors 110, 138, 210, 238 | .5 μ farad |
| Potentiometers 42, 72 | 100 0200 kilohms |
| Potentiometers 100, 200 | 10 kilohms |
| Resistors 44, 66 | 22 kilohms |
| Resistors 48, 112, 124, 134, 212, 224, 234 | 10 kilohms |
| Resistors 74, 120, 122, 220, 222 | 1 megohm |
| Resistor 50 | 330 kilohms |
| Resistor 88 | 100 kilohms |
| Resistors 90, 92 | 2.2 megohms |
| Resistor 94 | 4.7 kilohms |
| Resistor 102, 202 | 51 kilohms |
| Resistor 106, 206 | 5.1 megohms |
| Resistor 116, 216 | 150 kilohms |
| Resistor 128, 228 | 2 kilohms |
| Resistor 142, 242 | 20 kilohms |
| Resistor 130, 230 | 33 kilohms |
| Transformer 54 | u TC 0-19 |

Although the invention has been shown in connection with a preferred embodiment, it will be readily apparent to those skilled in the art that various changes in form and arrangement of parts may be made to suit requirements without departing from the spirit and scope of the invention as defined by the appended claims.

Having thus described my invention, I claim:

1. A flaw detection system for detecting defects in workpieces comprising:

a search probe including an impedance element;

an operational amplifier having an inverting input terminal, a non-inverting input terminal coupled to said impedance circuit element, and an output terminal;

first negative feedback circuit means coupled between said output terminal of said amplifier and said inverting input terminal of said amplifier;

positive feedback circuit means coupled between said output terminal of said amplifier and said non-inverting input terminal of said amplifier;

rectifier circuit means having an input terminal coupled to said output terminal of said operational amplifier and an output terminal for carrying a first level output signal representative of the presence of a flaw in proximity with said impedance element and a second level signal representative of the absence of a flaw in proximity with said impedance element; and, second negative feedback circuit means coupled between the output terminal of said rectifier circuit means and said inverting input terminal of said amplifier.

2. An apparatus as defined in claim 1 wherein said second negative feedback circuit means includes an automatic gain control circuit means coupled between said output terminal of said rectifier circuit means and said inverting input terminal of said operational amplifier.

3. An apparatus as defined in claim 2 wherein said circuit means includes integrator circuit means for preventing a signal developed by said automatic gain control circuit means from instantaneously changing from a first level to a second level.

4. An apparatus as defined in claim 2 wherein said circuit means comprises:
   integrator circuit means for preventing a signal developed by said automatic gain control circuit means from instantaneously changing from a first level to a second level; and,
   signal control means having a control terminal, a first output terminal and second output terminal, said control terminal being coupled to said output terminal of said rectifier circuit means, said first output terminal being coupled to said inverting input terminal of said operational amplifier, and said second output terminal being coupled to a reference voltage potential.

5. In a flaw detector for detecting defects in metallic workpieces, a search probe, an oscillator circuit coupled to said search probe and having an output terminal, a rectifier circuit means having an input terminal coupled to said output terminal of said oscillator circuit and an output terminal, and indicator means coupled to said output terminal of said rectifier means for providing an output indication upon the detection of a defect, the improvement comprising:
   said oscillator circuit including an operational amplifier having a first input terminal, a second input terminal coupled to said inspection probe, and an output terminal;
   first negative feedback circuit means coupled between said output terminal and said first input terminal of said amplifier;
   positive feedback circuit means coupled between said output terminal and said second input terminal of said amplifier;
   said rectifier means being coupled to said output terminal of said amplifier so that said indicator means provides an indication in response to a change in a signal developed by said operational amplifier; and,
   second negative feedback circuit means coupled between the output terminal of said rectifier circuit means and said first input terminal of said amplifier.

6. An apparatus as defined in claim 5 wherein said first input terminal of said operational amplifier is an inverting input terminal and said second input terminal is a non-inverting input terminal and said first negative feedback circuit is comprised of a resistive means coupled between said output terminal of said amplifier and said inverting input terminal of said operational amplifier.

7. An apparatus as defined in claim 6 wherein said second feedback circuit means includes an automatic gain control circuit means coupled between said output terminal of said rectifier circuit means and said inverting input terminal of said operational amplifier.

8. An apparatus as defined in claim 7 wherein said automatic gain control circuit means includes integrator circuit means for preventing a signal developed by said automatic gain control circuit means from instantaneously changing from a first level to a second level.

9. An apparatus as defined in claim 7 wherein said automatic gain control circuit means includes signal control means having a control terminal, and a first and second output terminal, said control terminal being coupled to said output terminal of said rectifier circuit means, said first output terminal being coupled to said inverting input terminal of said operational amplifier, and said second output terminal being coupled to a reference voltage potential.

10. An apparatus as defined in claim 9 wherein said signal control means is a field-effect transistor, said control terminal is the gate terminal of said field-effect transistor, and said first and second terminals are the drain and source terminals of said transistor.

11. An apparatus as defined in claim 7 wherein said automatic gain control circuit means comprises:
   integrator circuit means for preventing a signal developed by said automatic gain control circuit means from instantaneously changing from a first level to a second level; and,
   signal control means having a control terminal, a first output terminal and second output terminal, said control terminal being coupled to said output terminal of said rectifier circuit means, said first output terminal being coupled to said inverting input terminal of said operational amplifier, and said second output terminal being coupled to a reference voltage potential.

12. An apparatus as defined in claim 11 wherein said signal control means is a field-effect transistor, said control terminal is the gate terminal of said field-effect transistor, and said first and second output terminals are the drain and source terminals of said transistor.

13. A method of developing an indicator signal representative of the presence of defects with a flaw detection system having an oscillator circuit coupled to a search probe, said oscillator circuit including an amplifier having an input terminal and a positive and negative feedback loop, and comprising the steps of:
   positioning said search probe in proximity with the workpiece;
   inducing a circulating current into a workpiece to be inspected;
   developing a signal with said amplifier having a value representative of the value of a said circulating current;
   applying a positive feedback signal to said input terminal of said amplifier with said positive feedback loop, said positive feedback signal having a value representative of the value of said developed signal;
   applying a first negative feedback signal to said input terminal of said amplifier with said negative feedback loop, said first negative feedback signal having a value representative of the value of a signal developed by said amplifier to thereby stabilize said oscillator circuit;
   rectifying a said signal developed by said amplifier to thereby provide an indicator signal;
   applying a second negative feedback signal to said input terminal of said amplifier with a second feedback loop, said second negative feedback signal having a value representative of the value of a said indicator signal.

* * * * *